3,485,703
PLASTIC SUBSTRATE HAVING CERAMIC
COATING
Roger Alden Long, Escondido, Calif., assignor to
Whittaker Corporation, Los Angeles, Calif., a corporation of California
No Drawing. Filed Jan. 27, 1965, Ser. No. 428,552
Int. Cl. B32b 5/16, 19/02, 27/04
U.S. Cl. 161—87          7 Claims

ABSTRACT OF THE DISCLOSURE

This patent describes a plastic structure comprising a plastic base member provided with an intermediate transition zone containing both plastic and ceramic materials terminating at its surface, and firmly adhered to said surface a substantial uniform ceramic heat-resistant coating. This patent also describes the method of preparing such a plastic structure which comprises applying to a plastic base member having on at least one surface an intermediate ceramic transition zone, a substantially uniform ceramic heat-resistant composition.

---

This invention relates to a plastic structure characterized by having on at least one surface thereof, a ceramic coating which is resistant to water erosion, chemical and heat corrosion, and mechanical abrasion.

Heretofore, it has been known to apply either vitreous and/or crystalline ceramic coatings to finished plastic surfaces to provide a coating which will resist the effects of water, chemicals, heat, and mechanical abrasion. Generally, the ceramic coating applied directly to a finished plastic substrate is adhered to the substrate by mechanical adhesion. The adhesion between the plastic substrate and the ceramic coating is normally poor because of the difference in the thermal expansion of the ceramic coating and the plastic substrate, sometimes referred to as thermal expansion mismatch. Most ceramics will not sufficiently adhere to plastic substrates in order to provide adequate bonding strength therebetween to resist the stresses caused by the thermal expansion mismatch. According to the present invention, it has been found that the use of an intermediate transition zone between the plastic substrate and the ceramic coating will provide the requisite adhesion of the ceramic coating to the plastic substrate.

The transition zone is generally of graded composition and contains both plastic or reinforced plastic base material and ceramic material. Preferably the relative amounts of plastic and ceramic vary with the distance from the surface carrying the ceramic coating. Thus, immediately beneath the ceramic layer, the transition zone is composed predominantly of ceramic material, while the amount of ceramic material progressively decreases and the amount of plastic correspondingly increases as that portion of the transition zone most remote from the ceramic coating is approached.

The intermediate zone can be provided in any one of several different ways. In one way the intermediate zone may be provided by one or more layers of ceramic particles, preferably ceramic oxide spheres. For example, a layer of ceramic spheres may be embedded in the surface of the substrate. In this case, the surface plastic-sphere area provides the transition zone.

In another embodiment, alternating layers of ceramic spheres and reinforced plastic may be used in preparing the laminated plastic base, with an increasing amount of spheres in each layer as the surface is approached. In this way, the transition layer extends throughout most of the base member. Alternatively, the intermediate zone may be provided by using ceramic fibers at and underlying the surface of the plastic laminate from which at least some of the plastic binder has been depleted. These fibers can then either be fused in situ with the applied vitreous ceramic coating ingredients to form an adherent ceramic coating or used as a base for either flame or plasma-sprayed oxide coatings.

It is an object of this invention to provide a novel plastic shape, form, or body having at least one surface thereof coated with a ceramic coating which resists water erosion, chemical and heat corrosion, and mechanical abrasion, and which is electromagnetically compatible with the plastic substrate.

Another object of this invention is to provide a plastic shape, form or body having a ceramic coating on at least one surface thereof in which there is provided an intermediate transition zone between the plastic and the ceramic coating so that good adhesion and good electromagnetic characteristics are achieved between the plastic and the ceramic coating, the graded zone acting electrically to reduce the reflection at the barrier between the plastic and the ceramic.

Still another object of this invention is to improve the adhesion of ceramic coatings to plastic substrates, and to avoid the coating failures heretofore caused by thermal expansion mismatch.

These and other objects of this invention will, it is believed, be readily apparent to those skilled in the art from the detailed description which follows.

The structure of this invention generally comprises a laminated reinforced plastic base member having a substantially uniform ceramic coating firmly adhered to at least one outer surface thereof through an intermediate transition zone whereby failures due to thermal expansion mismatch and insufficient bonding strength between the ceramic coating and the plastic base member are minimized.

In a preferred embodiment the structure of this invention comprises a laminated reinforced plastic base member having ceramic spheres embedded in at least one surface thereof to provide an intermediate transition zone, and firmly adhered to the surface having said spheres, a heat resistant ceramic coating. The reinforcing material for the base is predominantly an amorphous material, usually fiberglass.

In the embodiment where the intermediate transition zone is provided by embedded spheres, the spheres can be embedded during layup of the laminated reinforced plastic base member, pressed into place on the base member while tacky, or sprayed or embedded in the surface of one of the individual layup fabrics. If the transition zone is to extend into the base, layers of spheres can be interposed between the individual fabrics located near the surface or between each fabric, as desired. Thereafter, the laminated reinforced base member having embedded spheres on the surface is ground relatively smooth to remove some of the plastic and provide a better surface to which either a vitreous ceramic coating or a sprayed oxide coating may adhere. The ceramic coating material may then be applied to the smoothed surface by spraying, painting, or dipping, and then, if necessary, vitrified by heat or flame to form a continuous, adherent vitreous layer. If a non-vitreous ceramic coating is applied by either flame or plasma spray, the vitrifying step is not required.

The ceramic spheres used in the foregoing embodiment may be solid or hollow, with the latter being preferred, and normally are composed of alumina, silica, magnesia, zirconia, or beryllia. These spheres can be of varied sizes for good packing and should be graded, the largest size used being about 20 mesh (Tyler) ranging downward to about minus 325 mesh.

In another embodiment, as above indicated, the transition zone is provided by the use of some ceramic fibers in lieu of glass as the reinforcing in the individual layup fabrics. A plurality of these fabrics are first laminated and then the surface resin is depleted. The depletion is accomplished by, for example, blasting the surface with gritty particles under high pressure. The ceramic coating may be applied by flame or plasma spray. When making a structure in this way, it is particularly desirable to use a resin binder in the base member having a high degree of thermal stability, on the order of 1000° F., since the resin is apt to reach a higher temperature during the application of the coating than is the case where the spheres are present.

The ceramic coating material used to form the vitreous coating may be, for example, a mixture of lead borate containing zinc oxide. Upon heating or flame treatment, this material will form a dark black vitreous coating. If in the particular application it is desired to avoid a dark black vitreous coating, vitreous coatings which are yellow in color may be obtained from the lead borate-zinc oxide material by incorporating therein a small amount of aqueous ammonium nitrate solution. It has been found that the presence of the ammonium nitrate accounts for the difference in the color of the ultimate vitreous coating layer. Alternately, the ceramic layer may be provided by flame or plasma spraying of, for example, an alumina, beryllia, zirconia, or thoria layer on the surface of the plastic substrate which has been previously prepared by embedding therein hollow spheres and/or by the depletion of the polymeric binder material at the surface of the plastic base member to expose the reinforcing fibrous material.

The term "ceramic" is used herein to cover all of the inorganic, non-metallic, substantially crystalline materials prepared by the use of heat. Generally, these materials contain less than 1% by weight of amorphous material.

The plastic base member is preferably a unitary laminate made up from a plurality of individual resin impregnated fiber cloths. A wide variety of resins may be employed to impregnate these cloths including epoxy such as the polyglycidylether of 2,2-bis-(4-hydroxy phenyl) propane, phenolic such as phenolformaldehyde, silicone such as polydimethylsiloxane and polydiphenylsiloxane, or polybenzimidazole, with the last-mentioned material being preferred because of its excellent heat resistance up to temperatures of 1000° F. These resins may be mixed with conventional curing agents, heat or radiation cured, or may be cured by heat or radiation alone.

Normally, a number of the resin impregnated glass cloths are used to form the unitary base member. The particular curing temperature and pressure employed is not critical and will depend, to some extent, upon the particular resin employed and the number of individual impregnated cloths being treated. Ordinarily the curing pressure is from about 200 to about 800 lbs. per sq. inch, and the curing temperature is from about 500° F. to about 900° F., with a curing temperature of 700° F. being preferred. The curing process normally requires from about 0.5 hours to about 10 hours. For a ¼ inch base member using polybenzimidazole as the impregnating resin, the curing takes about 3 hours. It has been found that the curing process can be conveniently completed by a process referred to as "post-curing." This procedure normally involves removing the nearly cured material from the press and heating it at atmospheric pressure in an inert atmosphere such as dry nitrogen gas at a temperature of from about 500° F. to about 800° F. for from about 1 to about 50 hours, and more preferably, from about 8 to 24 hours.

When the intermediate transition zone is provided by a layer of spheres, the spheres are preferably embedded in the base member during the curing process. This may be accomplished either by spreading a layer of the spheres on the bottom of the mold and placing thereover, the desired number of individual impregnated glass cloths with different sizes and quantities of ceramic spheres and building up the laminate with successive layers each containing a greater volume of spheres as the surface is approached, thus achieving a graded composition. The entire mass is then cured under elevated pressure and temperature in the manner already indicated. The product of this process will then be provided with one surface having the spheres embedded within it. The surface containing the spheres may be ground or grit blasted smooth in order to remove excess plastic and provide a better surface to which the ceramic coating may adhere.

A vitreous ceramic coating can be fused to the surface containing the embedded spheres by spraying, dipping or painting. In the case where it is desired that the vitreous coating be light in color, a lead borate-zinc oxide coating is preferably applied using an aqueous slurry containing 2% by weight ammonium nitrate. The ceramic coating thus applied may be cured by radiant heating, e.g., by placing the coated material in close proximity to heating elements, or by direct radiation from quartz heat lamps. A single spraying, dipping or painting will provide a vitreous coating approximately 10 mils in thickness. If a thicker coating is desired, the thickness may be built up by successively recoating and curing. In this way, a vitreous coating having a thickness up to about 60 mils may be readily attained. During the curing process, the temperature in the vicinity of the coated surface may be maintained within the range of from about 700° F. to about 900° F. for best results. A main advantage of the already embedded spheres is their insulating resistance afforded to the plastic substrate during either the firing or spraying heat application, thus they protect the underlying plastic from heat degradation during the firing or heat cycle. The glasses than can be used for a fused-on coating may vary over a wide range and still be acceptable. Typical of such glasses are lead-borate, barium borate, zinc borate and lead silicate. In general, any ceramic glass that will fuse at a temperature below about 1400° F. within a reasonable length of time is suitable.

As has already been indicated, the ceramic coating may also comprise flame or plasma sprayed alumina, zirconia, beryllia, or the like. There are spray guns commercially available which will spray ceramics. The ceramics are commonly furnished in rod form to the gun. This rod is fed to the gun by means of a variable speed feed roll and into an oxy-acetylene flame which melts the rod and blasts the molten particles on the prepared surface forming thereon a ceramic coating. Spray guns of this type are now manufactured by Metco, Inc. of New York and the Mogul Company of Chicago.

There are also available spray guns adapted to spray ceramics and metals in powdered form. The ceramic, in powder form, is widely available. The ceramic powder is fed to an oxy-acetylene flame or an oxy-hydrogen flame either by gravity or air or gas pressure. The molten powder particles are blown onto prepared surface by an air or gas blast or by the velocity of the flame, resulting in a ceramic coating.

A plasma arc gun of the non-transferred arc type may also be used. Some manufacturers of this equipment are Metco, Inc., Plasmadyne of Santa Ana, Calif., and Avco of Wilmington, Mass. The heat for the flame is produced by passing a gas preferably nitrogen or argon, through an electric arc. The gas is ionized and restricted passing through the arc forming a plasma flame of temperatures up to 20,000° F. The powdered ceramic is forced into this flame by gas pressure which melts the particles and blasts them in molten form onto the prepared surface, producing a ceramic coating.

When one of these materials is used to form the ceramic coating, it is applied most conveniently by flame spraying at a pressure of about 90 lbs. per sq. inch. Usually the nozzle of the applicator is held from about 6 to 8 inches from the surface in which the spheres are embedded. The coating temperature used in the practice of this technique is dependent on the particular coating material employed. For example, when alumina is employed as the coating material, the deposition temperature is best maintained at about 1200° F. However, when zirconia is used, the deposition temperature is normally about 1500° F. The flame sprayed coatings are normally from about 20 to 30 mils thick. These coatings may sometimes have a rather rough surface in which case they may be ground to provide a smooth coating of from about 15 to about 20 mils in thickness.

When spheres are empolyed in the intermediate transition zone, it is preferred that they be hollow. When the hollow spheres are embedded in the plastic base member and then machined or ground smooth, at least some of these spheres are sectioned such that their inner surface is open and available for adhesion to the overlying ceramic coating, particularly the vitreous coating.

Those skilled in the art will readily recognize that the present invention may be practiced in many ways using various materials under different conditions. Accordingly, it will be appreciated that the following examples are presented solely to illustrate the invention and should not be regarded as limitative in any way. In the examples, the parts and percentages are by weight, unless otherwise indicated.

EXAMPLE I

Into the bottom of a mold was uniformly spread about a 1/16 inch layer of hollow alumina ceramic spheres having a diameter ranging from 20 mesh (Tyler) to —360 mesh. Over the spheres were then placed eight glass cloths impregnated with polybenzimidazole resin. The entire composite was then heated to 800° F. under a pressure of 800 lbs. per sq. inch. After several hours, an integral essentially cured plastic structure was obtained. The resulting plastic laminate structure had the alumina spheres bonded to the polybenzimidazole resin and firmly embedded into the surface. The overall thickness of the alumina sphere layer was approximately 0.030 inch. The surface of the structure carrying the alumina spheres was then ground smooth with a silicon carbide polishing slab. This produced sheared spheres thus providing concave surfaces which act as anchorage locations for the subsequently applied ceramic coating. A coating composition containing lead borate and zinc oxide (having analyses expressed in oxides of 77% PbO, 10% ZnO, and 10% $B_2O_3$) in a 2% aqueous solution of ammonium nitrate was prepared. This solution was then brush coated on the ground surface of the base member containing the embedded alumina spheres. Initial firing of this first coat was accomplished by placing the material on a fire brick situated close to the top heating elements of an electric kiln to simulate quick radiant heating. The following temperatures were observed with a thermocouple situated 1/4 inch from the top of the coated surface.

| Time | Temperature, °F. | Remarks |
| --- | --- | --- |
| Start | 760 | |
| 10 minutes | 870 | Coating starting to glaze. |
| 12 minutes | 890 | Coating vitrified and specimen removed from furnace. |

After cooling, the specimen was recoated with the same material, dried and refired as follows:

| Time | Temperature, °F. | Remarks |
| --- | --- | --- |
| Start | 705 | |
| 5 minutes | 790 | Starting to glaze. |
| 10 minutes | 870 | Glaze completed, specimen removed from furnace. |

The vitreous coating thus produced was about 0.040 inch in thickness. The coating was dense and satisfactorily bonded to the underlying plastic surface.

EXAMPLE II

Into the bottom of a mold was uniformly spread about a 1/16 inch layer of hollow alumina ceramic spheres having a diameter ranging from 20 mesh (Tyler) to —360 mesh (Tyler). Over the spheres were then placed eight glass cloths impregnated with polybenzimidazole resin. The entire composite was then heated to 800° F. under a pressure of 800 lbs. per sq. inch. After several hours, an integral essentially cured plastic structure was obtained. The resulting plastic laminate structure had the alumina spheres bonded to the polybenzimidazole resin and firmly embedded into the surface. The overall thickness of the structure was approximately 1/8 inch in depth and the thickness of the alumina sphere layer was approximately 0.030 inch. The surface of the structure carrying the alumina spheres was then ground smooth with a silicon carbide polishing slab. Alumina is then applied to the prepared surface by flame spraying, the nozzle of the applicator being held about 6 inches from the surface. Application is continued until a layer of about 30 mils is built up. This layer is tenaciously adhered to the underlying surface, and withstands flexural testing and thermal shocking from 1000° F. to ambient air temperature.

When the foregoing example is repeated using the polyglycidylether of 2,2 - bis - (4 - hydroxyphenyl)propane in lieu of polybenzimidazole as the impregnating resin, equally satisfactory results are obtained.

EXAMPLE III

Into the bottom of a mold was uniformly spread about a 1/16 inch layer of hollow alumina ceramic spheres having a diameter ranging from 20 mesh (Tyler) to —360 mesh (Tyler). Over the spheres were then placed eight glass cloths impregnated with polybenzimidazole resin. The entire composite was then heated to 800° F. under a pressure of 800 lbs. per sq. inch. After several hours, an integral essentially cured plastic structure was obtained. The resulting plastic laminate structure had the alumina spheres bonded to the polybenzimidazole resin and firmly embedded into the surface. The overall thickness of the structure was approximately 1/8 inch in depth and the thickness of the alumina sphere layer was approximately 0.030 inch. The surface carrying spheres are then blasted by vapor grit which erodes the plastic around the spheres. Any grit remaining on the blasted surface is then removed. Alumina is then applied to the prepared surface by flame spraying, the nozzle of the applicator being held about 6 inches from the surface. Application is continued until a layer of about 30 mils is built up. This layer is tenaciously adhered to the underlying surface, and withstands flexural testing and thermal shocking from 1000° F. to ambient air temperature. This sprayed layer was then sealed with a glaze material to increase its emittance and to seal the porosity of the sprayed coating. Firing was accomplished as in Example I.

EXAMPLE IV

Eight combination ceramic and glass cloths impregnated with polybenzimidazole resin were placed in a mold. Curing was then carried out at 800° F. and 800 p.s.i. After several hours, the integral cured structure was removed from the mold. The ceramic cloth surface of the surface was then grit blasted to remove a majority of the plastic surrounding the ceramic fibers. After cleaning the surface to remove any loose material, alumina is then applied to the prepared surface by flame spraying, the nozzle of the applicator being held about 6 inches from the surface. Application is continued until a layer of about 30 mils is built up. The resulting layer is tenaciously adhered to the underlying surface and withstands flexural testing and thermal shocking from 1000° F. ambient air temperature.

EXAMPLE V

Twelve glass cloths impregnated with polybenzimidazole resin were placed in a mold. Then alternating layers of hollow alumina spheres [from about 20 mesh (Tyler) to about −360 mesh (Tyler)] and impregnated glass cloths were placed in the mold, the amount of alumina being gradually increased with each layer until the number of cloths totaled sixteen. The mass was then cured as in Example IV. The resulting structure was about ¼ inch in depth and the thickness of the transition zone was about 0.060 inch. The surface is then blasted by vapor grit to erode some of the plastic around the surface spheres. Any loose grit is removed. Alumina is then applied to the prepared surface by flame spraying, the nozzle of the applicator being held about 6 inches from the surface. Application is continued until a layer about 30 mils is built up. This layer is tenaciously adhered to the underlying surface and withstands flexural testing and thermal shocking from 1000° F. to ambient temperature.

The ceramic coated plastic articles of this invention possess a variety of important uses as will be apparent to those skilled in the art. One particular application is for radomes (electromagnetic windows). In this application, it is preferred to use polybenzimidazole as the impregnating resin because of its heat resistance and good electrical transmission. Other applications for the ceramic coated articles of this invention may be where wear-resistance of a surface is required or where localized heat deflection is needed.

I claim:

1. A plastic structure comprising a fiber reinforced laminated plastic base member composed of alternating layers of resin-impregnated cloth and hollow ceramic spheres, the amount of ceramic spheres in each succeeding sphere layer increasing as the surface of said base member is approached, and firmly adhered to one outer surface having said spheres, a substantially uniform ceramic heat-resistant coating.

2. The structure of claim 1 wherein the plastic is a polybenzimidazole resin.

3. The structure of claim 1 wherein the plastic is an epoxy resin.

4. The structure of claim 1 wherein the plastic is a polysiloxane resin.

5. The structure of claim 1 wherein the hollow ceramic spheres are hollow metal oxide spheres.

6. The structure of claim 1 wherein the hollow ceramic spheres are hollow alumina spheres.

7. The structure of claim 1 wherein the hollow ceramic spheres are hollow zirconia spheres.

References Cited

UNITED STATES PATENTS

| 3,316,139 | 4/1967 | Alford et al. | 161—72 |
| 3,179,531 | 4/1965 | Koubek | 117—23 |
| 3,174,947 | 3/1965 | Marvel et al. | 260—47 |
| 3,165,864 | 1/1965 | Shulze | 161—166 |
| 2,973,563 | 3/1961 | Leaberry et al. | 117—126 X |

ROBERT F. BURNETT, Primary Examiner

M. A. LITMAN, Assistant Examiner

U.S. Cl. X.R.

117—21, 124; 161—73, 98, 158, 162, 166